US008555227B2

(12) United States Patent
Mallem et al.

(10) Patent No.: US 8,555,227 B2
(45) Date of Patent: Oct. 8, 2013

(54) CLOCK TREE FOR PULSED LATCHES

(75) Inventors: Yahia Mallem, Grenoble (FR); Mickael Giroud, Voiron (FR); Lionel Jure, Domene (FR)

(73) Assignee: Dolphin Integration, Meylan (FR)

( * ) Notice: Subject to any disclaimer, the term of this patent is extended or adjusted under 35 U.S.C. 154(b) by 0 days.

(21) Appl. No.: 13/197,930

(22) Filed: Aug. 4, 2011

(65) Prior Publication Data

US 2012/0032721 A1 Feb. 9, 2012

(30) Foreign Application Priority Data

Aug. 6, 2010 (FR) ...................................... 10 56494

(51) Int. Cl.
G06F 17/50 (2006.01)
(52) U.S. Cl.
USPC ........... 716/114; 716/111; 716/113; 716/108; 716/101
(58) Field of Classification Search
USPC ........................... 716/101, 114, 108, 111, 113
See application file for complete search history.

(56) References Cited

U.S. PATENT DOCUMENTS

| 5,557,225 | A  | * | 9/1996  | Denham et al. | 327/199 |
| 5,742,190 | A  |   | 4/1998  | Banik         |         |
| 5,973,529 | A  | * | 10/1999 | Chappell et al. | 327/200 |
| 6,433,598 | B1 | * | 8/2002  | Schultz       | 327/161 |
| 6,574,781 | B1 | * | 6/2003  | Harada et al. | 716/114 |
| 6,782,520 | B1 | * | 8/2004  | Igusa et al.  | 716/114 |
| 6,785,173 | B2 | * | 8/2004  | Sohn et al.   | 365/201 |
| 7,253,661 | B1 | * | 8/2007  | Tuan et al.   | 326/46  |
| 7,358,786 | B2 | * | 4/2008  | Kim           | 327/202 |
| 7,559,045 | B2 | * | 7/2009  | Chen et al.   | 716/106 |
| 7,634,749 | B1 | * | 12/2009 | Cortadella et al. | 716/100 |
| 7,694,242 | B1 | * | 4/2010  | Li et al.     | 716/100 |
| 8,050,117 | B2 | * | 11/2011 | Ko et al.     | 365/191 |
| 8,074,190 | B1 | * | 12/2011 | Li et al.     | 716/100 |
| 8,086,982 | B2 | * | 12/2011 | Chang et al.  | 716/114 |
| 8,453,085 | B2 | * | 5/2013  | Ge et al.     | 716/108 |
| 2002/0143515 | A1 | * | 10/2002 | Nadeau-Dostie et al. | 703/19 |
| 2003/0076727 | A1 | * | 4/2003  | Hoon          | 365/222 |
| 2003/0177455 | A1 | * | 9/2003  | Kaufman et al. | 716/2  |

(Continued)

FOREIGN PATENT DOCUMENTS

EP 0271596 A1 6/1988

OTHER PUBLICATIONS

Seonggwan Lee, et al., "Retiming and time borrowing: Optimizing High-Performance Pulsed-Latch-Based Circuits", ICCAD 2009, Nov. 2, 2009 pp. 375-380, XP031586190, IEEE Piscataway, NJ.
Peiyi Zhao, et al., "High-Performance and Low-Power Conditional Discharge Flip-Flop", IEEE Transactions on Very Large Scale Integration (VLSI) Systems, vol. 12, No. 5, May 2004 pp. 477-484, XP011111707, IEEE Service Center, Piscataway, NJ.
European Search Report issued in FR1157167 on Dec. 19, 2011.

(Continued)

*Primary Examiner* — Jack Chiang
*Assistant Examiner* — Brian Ngo
(74) *Attorney, Agent, or Firm* — Vedder Price PC

(57) ABSTRACT

The invention concerns a computer implemented method of circuit conception of a clock tree (200) comprising: a plurality of pulse generators (202) each being coupled to the input of one or more pulsed latches and being arranged to generate a pulsed signal (PS); and a tree of buffers (204) for supplying a clock signal (CLK) to the pulse generators, the method comprising: the conception of the clock tree without pulse generators based on a timing analysis by the computer of the propagation of clock edges in the clock tree; and replacing by the computer in the clock tree at least one buffer, coupled to the input of each pulsed latch, by a pulse generator.

10 Claims, 2 Drawing Sheets

(56) References Cited

U.S. PATENT DOCUMENTS

| | | | |
|---|---|---|---|
| 2003/0230769 A1* | 12/2003 | Tsutsumi et al. | 257/207 |
| 2006/0101362 A1* | 5/2006 | Haar et al. | 716/6 |
| 2006/0253821 A1* | 11/2006 | Kitahara et al. | 716/6 |
| 2007/0001734 A1* | 1/2007 | Onouchi et al. | 327/218 |
| 2009/0024861 A1* | 1/2009 | Shimazaki et al. | 713/324 |
| 2009/0195287 A1* | 8/2009 | Ho et al. | 327/298 |
| 2011/0307850 A1* | 12/2011 | Dartu et al. | 716/108 |

OTHER PUBLICATIONS

Seonggwan Lee et al, "Retiming and time borrowing: Optimizing high-performance pulsed latch-based circuits", ICCAD 2009, Nov. 2, 2009 to 2009-00-05, pp. 375-380.

Peiyi Zhao et al., "High-Performance and Low-Power Conditional Discharge Flip-Flop", IEEE Transactions on Very Large Scale Integration, (VLSI) Systems, vol. 12, No. 5, (May 2004), pp. 477-484.

* cited by examiner

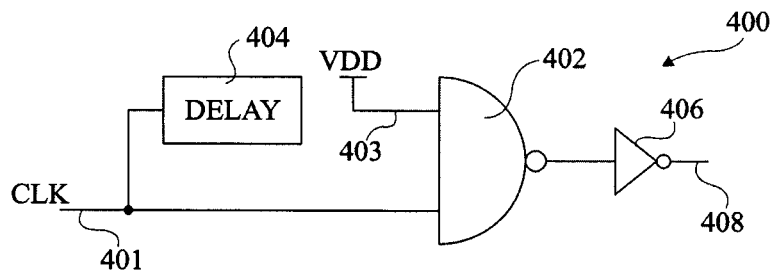
Fig 4A
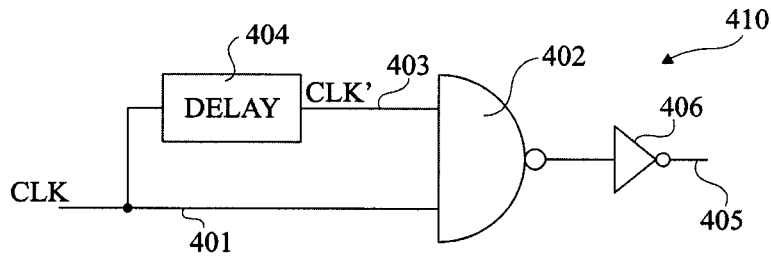
Fig 4B
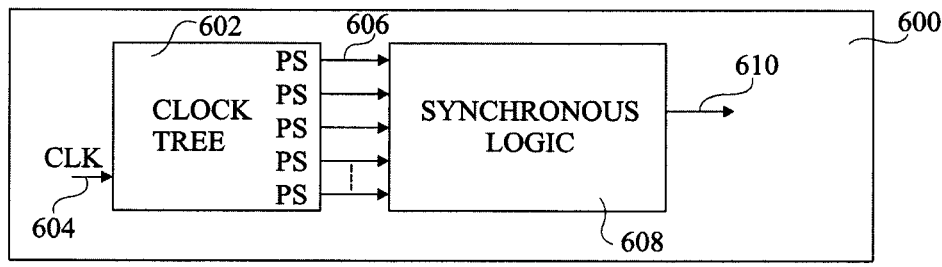
Fig 5
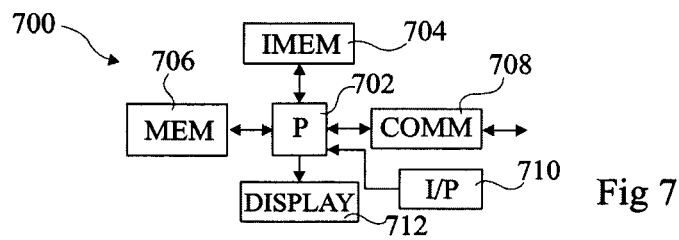
Fig 6
Fig 7

CLOCK TREE FOR PULSED LATCHES

FIELD OF THE INVENTION

The present invention relates to a clock tree and to a method of circuit conception of a clock tree for providing a pulsed signal to a plurality of latches.

BACKGROUND TO THE INVENTION

A distinction is made between flip-flops, which are controlled by a rising or falling edge, and pulsed latches, which are controlled by a pulsed signal.

In order to control a flip-flop, a control signal, such as a clock signal, is distributed to each flip-flop by a clock tree comprising latches. The dimensions of this clock tree are chosen to respect certain synchronisation constraints of the control signal at the input of each flip-flop.

Pulsed latches are less complex than flip-flops, and thus allow more compact circuit designs and reduced power consumption. Data is input to a pulsed latch during a high pulse of a pulsed timing signal. The pulsed timing signal is generated by a pulse generator, and each of the pulses generally has a pulse width significantly shorter than the high or low periods of a normal clock signal.

Whereas today synchronous circuits generally use flip-flops as the synchronisation elements, for the above reasons it would be desirable to replace the flip-flops by pulsed latches. However, during the conception of the clock tree, digital circuit implementation tools are adapted to perform timing analysis based on propagation of clock edges rather than an analysis based on pulses, and they often do not allow the insertion of pulse generators. There is thus a problem in the conception and verification of circuit designs based on pulsed latches.

SUMMARY OF THE INVENTION

It is an aim of the present invention to at least partially address one or more problems in the prior art.

According to one aspect of the invention, there is provided a computer implemented method of circuit conception of a clock tree comprising: a plurality of pulse generators each being coupled to the input of one or more pulsed latches and being arranged to generate a pulsed signal; and a tree of buffers for supplying a clock signal to the pulse generators, the method comprising: the conception of the clock tree without pulse generators based on a timing analysis by the computer of the propagation of clock edges in the clock tree; and replacing by the computer in the clock tree at least one buffer, coupled to the input of each pulsed latch, by a pulse generator.

According to one embodiment, the method further comprises, after said replacing step, performing a timing analysis of the clock tree circuit by said computer.

According to another embodiment, during said clock edge timing analysis each of the buffers of said clock tree is implemented by a circuit identical to said pulse generators except that its pulse generation function is rendered inactive by said computer, and said step of replacing the final buffer before each latch by a pulse generator comprises reactivating by said computer the pulse generation function of said final buffers.

According to another embodiment, during said clock edge timing analysis each of the buffers of said clock tree is implemented by a circuit comprising a logic gate having a first input for receiving said clock signal, and a delay block for generating a delayed and inverted version of said clock signal, wherein a second input of said logic block is coupled to a reference voltage.

According to another embodiment, said step of replacing by the computer at least one buffer by a pulse generator comprises disconnecting the second input of said logic gate from said reference voltage and coupling it to the output of said delay block.

According to a further aspect of the present invention, there is provided a method comprising: the above computer implemented conception of a clock tree; and the fabrication of the circuit resulting from said conception.

According to a further aspect of the present invention, there is provided a computer programmed to implement the above method.

According to a further aspect of the present invention, there is provided a digital storage medium storing a program suitable for implementing the above method.

According to a further aspect of the present invention, there is provided a clock tree for supplying a pulsed signal to a plurality of pulsed latches comprising: a plurality of pulse generators each coupled to control at least one of said plurality of pulsed latches; and a tree of buffers for supplying a clock signal to each of said pulse generators, wherein each buffer of said tree of buffers comprises a circuit identical to said pulse generator except that its pulse generation function is rendered inactive.

According to one embodiment, each buffer of said tree of buffers comprises a logic gate having a first input for receiving said clock signal, and a delay block for generating a delayed and inverted version of said clock signal, wherein a second input of said logic block is coupled to a reference voltage.

According to another embodiment, said logic gate is a NAND gate.

According to a further aspect of the present invention, there is provided an integrated circuit comprising logic synchronized by a plurality of pulsed latches, and the above clock tree arranged to supply a pulsed signal to each of said pulsed latches.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which:

FIG. 4A illustrates a buffer circuit according to an embodiment of the present invention;

FIG. 4B illustrates a pulse generator according to an embodiment of the present invention;

FIG. 5 is a flow diagram showing steps in a method of circuit conception and fabrication of a clock tree according to a further embodiment of the present invention;

FIG. 6 illustrates an integrated circuit comprising a clock tree according to embodiments of the present invention; and FIG. 7 illustrates a computer according to an embodiment of the present invention.

DETAILED DESCRIPTION OF EMBODIMENTS OF THE PRESENT INVENTION

In the following, only features and aspects that are useful to an understanding of the invention are discussed in detail. Other features, such as the particular circuit design of a pulsed latch, will be within the normal capabilities of those skilled in the art, and will not be described in detail.

Figure 1:
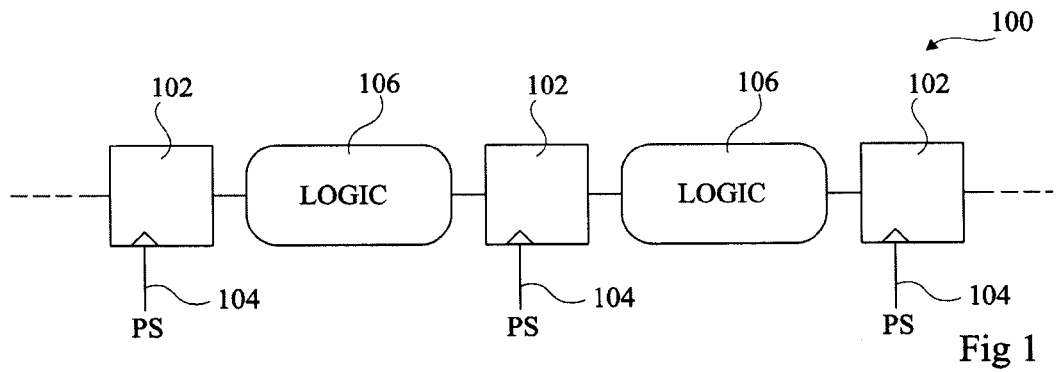
FIG. 1 illustrates synchronous circuitry based on pulsed latches according to an embodiment of the present invention.

FIG. 1 illustrates synchronous circuitry 100, which is synchronized by pulsed latches 102, three of which are illustrated. Each pulsed latch comprises an input line 104 for receiving a pulsed signal PS. During each pulse of the pulsed signal PS, the pulsed latches 102 each store the data present at their input node. At the end of each pulse, the data stored by the pulsed latch becomes valid. The operation of logic blocks 106 coupled between pairs of the pulsed latches 102 is thereby synchronized.

While FIG. 1 shows only three pulsed latches, a typical integrated circuit may comprise hundreds or thousands of such latches. To supply each of these pulsed latches with the pulsed signal PS, one solution would be to generate a single pulsed signal by a pulse generator, and to distribute the pulsed signal via a standard clock tree of buffers. However, a problem with such an approach is that the pulse widths of the pulsed signal are critical to the correct operation of the latches, and the clock tree risks causing variations in the pulse widths. Furthermore, tools for constructing clock trees are based on clock edge timing analysis, and are thus not adapted for verifying the pulse widths of the pulsed signal supplied to each pulsed latch.

Figure 2:
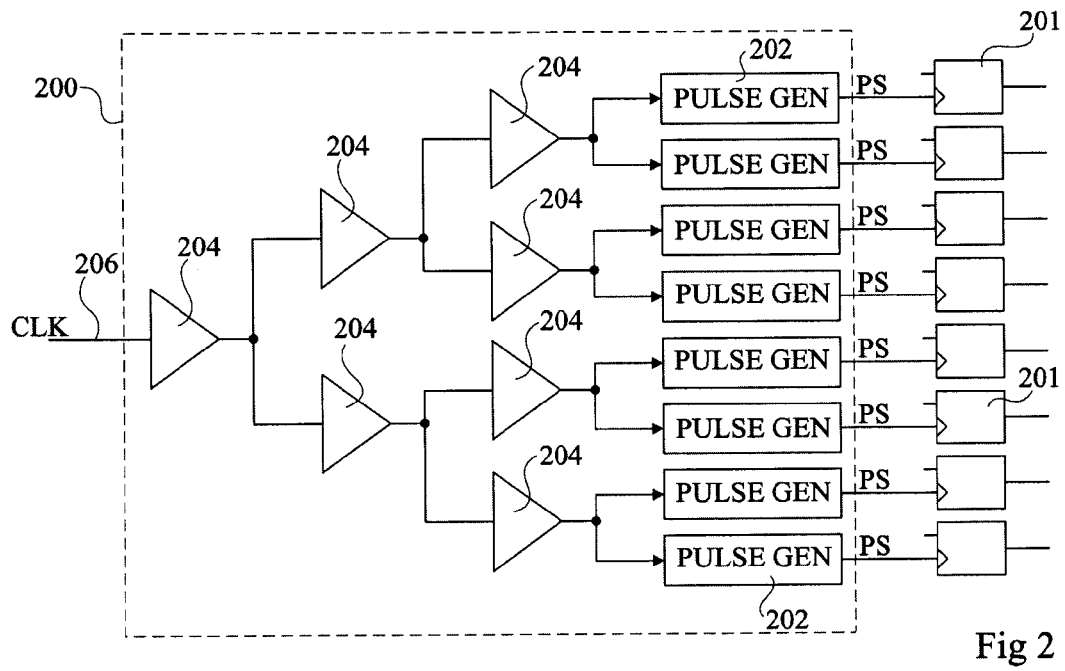
FIG. 2 illustrates a clock tree for providing a plurality of pulsed signals according an embodiment of the present invention.

FIG. 2 illustrates a clock tree 200 for providing pulsed signals PS to a number of pulsed latches, in this example eight pulsed latches 201. Rather than using a single pulse generator, the clock tree 200 comprises a plurality of pulse generators 202. In this example, a pulse generator 202 is provided for each pulsed latch 201, although in alternative embodiments, each pulse generator 202 could control more than one pulsed latch 201. The clock tree 200 further comprises a tree of buffers 204 for supplying a clock signal CLK on an input line 206 to each of the pulse generators 202. In this example, each buffer 204 is capable of driving the inputs of a further two buffers or pulse generators, and thus seven buffers 204 are able to supply eight pulse generators 202 with the clock signal CLK.

The clock tree 200 is obviously but one example, and in alternative embodiments it could comprise any number of pulse generators 202 supplied by an appropriate number of buffers.

An advantage of the clock tree 200 is that the pulsed signal does not propagate through the clock tree, and thus the pulse widths do not risk being distorted. Instead, the tree of buffers propagates a standard clock signal CLK and can thus be analysed using standard means, as will now be described with reference to FIG. 3. In certain cases, one or more buffers of the clock tree can be coupled between the pulse generators 202 and the latches 201, for example if it is determined that the pulses provided by the latches 201 are not too distorted by these buffers.

Figure 3:
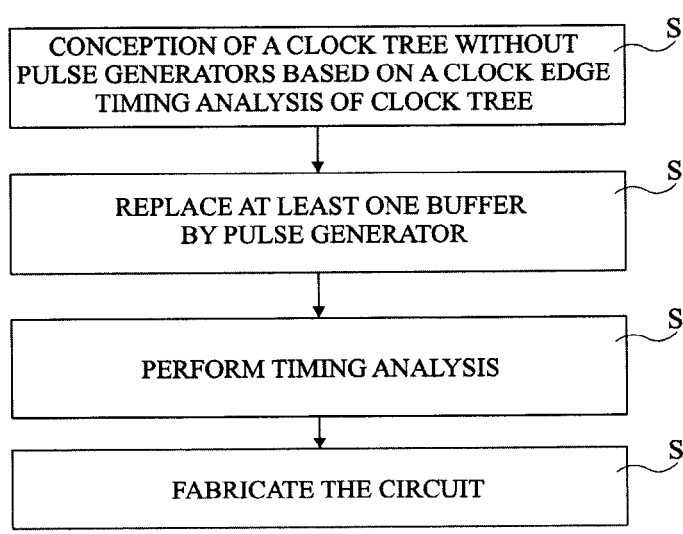
FIG. 3 is a flow diagram showing steps in a method of circuit conception and fabrication of the clock tree of FIG. 2 according to an embodiment of the present invention.

FIG. 3 is a flow diagram showing steps in a method of computer implemented circuit conception and fabrication of a clock tree based on the circuit arrangement of FIG. 2.

In a step S1, the conception of a clock tree without pulse generators is performed, based on a computer implemented clock edge timing analysis of the clock tree. For example, with reference to the clock tree 200 of FIG. 2, the clock edge timing analysis is performed based on a circuit conception in which a buffer is positioned in place of each of the pulse generators 202. Depending on the result of the timing analysis, the sizing of one or more of the buffers 204 of the clock tree may be adjusted and/or buffers may be added or removed by the user of the computer and/or automatically by the computer. In this way, the clock edges propagating through the tree can be ensured to be well synchronized with each other.

In a subsequent step S2, the computer replaces at least one buffer by a pulse generator 202. For example, to identify the buffers to be replaced, a search is made by the computer for the buffer connected directly to the pulse signal input of each pulsed latch, or in some cases a buffer connected to this input via one or more buffers. In the example of FIG. 2, this therefore results in the circuit arrangement of the illustrated clock tree 200. Knowing that the clock signals supplied to each pulse generator 202 are well synchronized, it follows that the pulses provided by pulse generators will be well synchronized. Furthermore, assuming that the pulse generators 202 are identical, as the pulsed signal does not propagate through further buffers, the pulse widths will be well matched.

An optional subsequent step S3 for example involves performing by the computer a timing analyse of the operation of the clock tree and of the logic circuitry that is driven by the pulsed latches.

A final step S4 comprises the fabrication, under the control of a computer, of the circuit resulting from the conception comprising the clock tree with pulse generators.

FIGS. 4A and 4B respectively show examples of a circuit 400 for implementing the buffers 204 and a circuit 410 for implementing the pulse generators 202 of FIG. 2.

As shown in FIG. 4A, the buffer 204 comprises circuitry that is very similar to a pulse generator. A clock input line 401 is coupled to a first input of a NAND gate 402. A second input of NAND gate 402 is coupled via an input line 403 to a logic high voltage $V_{DD}$. The clock input line 401 is also coupled to a delay inverter block 404, which comprises one or more delay elements. For example, the delay block 404 comprises a plurality of inverters coupled in series (not illustrated). However, the output of the delay block 404 is left floating, such that this branch of the circuit is non-operational. This means that the pulse generation functionality of the circuit has been rendered inactive, and the output of the NAND gate 402 is thus merely an inversion of the clock signal CLK. The output of NAND gate 402 is coupled to an inverter 406 to provide, on an output line 408 of the buffer, the original clock signal CLK after buffering.

As shown in FIG. 4B, the pulse generator 202 for example comprises exactly the same structure as buffer 204, except that rather than being coupled to $V_{DD}$, the second input of NAND gate 402 is coupled to the output of the delay inverter block 404, which is a delayed and inverted version CLK' of the clock signal CLK. Thus rather than operating as a simple buffer, the circuit 202 operates as a pulse generator. In particular, when the clock signal CLK goes high, the signal on line 405 goes high. It goes low again when the delayed and inverted version CLK' of the clock signal goes low. Thus the pulsed signal that is generated with have pulse widths dependent on the delay introduced by the delay block 404.

FIG. 5 is a flow diagram showing steps of a method of computer implemented circuit conception and fabrication of a clock tree based on the buffer 400 and pulse generator 410 of FIGS. 4A and 4B.

In a first step S1, the conception of the clock tree is performed, based on a computer implemented clock edge timing analysis of the clock tree with each of the pulse generators deactivated to perform as buffers. For example, in circuit 410 of FIG. 4B, this is achieved by coupling by the computer the input line 403 to $V_{DD}$, resulting in the buffer circuit 400. Each of the buffers of the clock tree is preferably also implemented by the buffer 400 of FIG. 4A, such that any of the buffers of the clock tree may be converted into a pulse generator during the subsequent step S2. Based on the computer implemented timing analysis, the dimensions of one or more of the buffers of the clock tree may be adjusted and/or buffers may be added or removed by the user of the computer and/or automatically by the computer. In this way, the clock edges propagating through the tree can be ensured to be well synchronized with each other.

In the next step S2, at least one buffer, for example the one connected to the input of each pulsed latch, is converted into a pulse generator by the computer. This is for example achieved by coupling the second input line 403 of the logic gate 402 to the output of the delay block 404. Advantageously, as this step involves only the alteration of a number of connections, the circuit layout is very little affected.

As with step S3 of FIG. 3, an optional subsequent step S3 is for example to perform a computer implemented timing analysis of the clock tree and of the operation of the logic that is driven by the pulsed latches.

As with step S4 of FIG. 3, a final step S4 comprises the fabrication, under the control of a computer, of the circuit resulting from the conception comprising the clock tree with pulse generators.

FIG. 6 illustrates an integrated circuit 600 comprising a clock tree 602, which is for example the clock tree 200 described above, although the number of pulsed latches, pulse generators and buffers may be different. Each of the buffers is for example implemented by the circuit 400 of FIG. 4A, and each of the pulse generators is for example implemented by the circuit 410 of FIG. 4B.

The clock tree 602 receives a clock signal 604, and provides a number of pulsed signals PS on output lines 606 to synchronous logic 608, which uses pulsed latches as the synchronizing elements. The synchronous logic provides output data on an output line 610, which is for example stored in memory and/or output of the integrated circuit.

FIG. 7 illustrates an example of a computer 700 suitable for performing the method of FIGS. 3 and 5. The computer 700 comprises a processor 702, coupled to an instruction memory 704, a main memory 706, a communications interface 708, one or more control inputs 710 and a display 712. The instruction memory 704 is for example a volatile memory such as an SRAM (static random access memory) or FLASH memory, and stores instructions for controlling the processor 702 to implement the method of FIGS. 3 and 5. The main memory 706 is for example implemented by a non-volatile memory such as a hard disk, and stores for example representations of the circuit during and after conception. The communications interface 708 for example allows the exportation of the circuit resulting from the conception to a fabrication device, for controlling the fabrication of an integrated circuit comprising the clock tree circuit described herein. The control inputs 710 and display 712 allow for example a user to control and follow the conception of the clock tree.

An advantage of the embodiments described herein is that pulsed signals can be supplied to a plurality of latches without the risk of distorting the pulses by transmission through a clock tree. Furthermore, timing analysis may be performed based on clock edges, in a quick and efficient manner.

While a number of specific embodiments of the invention have been described with reference to the figures, it will be apparent to those skilled in the art that there are numerous modifications and variations that may be applied.

For example, it will be apparent to those skilled in the art that the pulse generator and buffer implementations of FIG. 4B are merely examples, and other circuits are possible. For example, the NAND gates 402 could be replaced by other logic gates such as NOR gates.

Furthermore, it will be apparent to those skilled in the art that the principles described herein could be applied to clock trees for supplying a pulsed signal to any number of pulsed latches.

It will be apparent to those skilled in the art that the various features described herein in relation to the various embodiments could be combined in any combination in alternative embodiments of the invention.

The invention claimed is:

1. A computer implemented method of circuit conception of a clock tree comprising: a plurality of pulse generators each being coupled to the input of one or more pulsed latches and being arranged to generate a pulsed signal; and a tree of buffers for supplying a clock signal to the pulse generators, the method comprising:
   the conception of the clock tree without pulse generators based on a timing analysis by the computer of the propagation of clock edges in the clock tree wherein during said clock edge timing analysis each of the buffers of said clock tree is implemented by a circuit identical to said pulse generators except that its pulse generation function is rendered inactive by said computer, and said step of replacing the final buffer before each latch by a pulse generator comprises reactivating by said computer the pulse generation function of said final buffers; and
   replacing by the computer in the clock tree at least one buffer, coupled to the input of each pulsed latch, by a pulse generator.

2. The method of claim 1, further comprising, after said replacing step, performing a timing analysis of the clock tree circuit by said computer.

3. The method of claim 1, wherein during said clock edge timing analysis each of the buffers of said clock tree is implemented by a circuit comprising a logic gate having a first input for receiving said clock signal, and a delay block for generating a delayed and inverted version of said clock signal, wherein a second input of said logic block is coupled to a reference voltage.

4. The method of claim 3, wherein said step of replacing by the computer at least one buffer by a pulse generator comprises disconnecting the second input of said logic gate from said reference voltage and coupling it to the output of said delay block.

5. A method comprising:
   the computer implemented conception of a clock tree according to claim 1; and
   the fabrication of the circuit resulting from said conception.

6. A computer programmed, via instructions stored in a digital storage device, to implement the method of claim 1.

7. A non-transitory digital storage medium storing a program suitable for implementing the method of claim 1 when executed on a computer.

8. A clock tree for supplying a pulsed signal to a plurality of pulsed latches comprising:
   a plurality of pulse generators each coupled to control at least one of said plurality of pulsed latches; and
   a tree of buffers for supplying a clock signal to each of said pulse generators, conception of the tree of buffers is based on a timing analysis of the propagation of clock edges in the tree of buffers, and wherein each buffer of said tree of buffers comprises a circuit identical to said pulse generator except that its pulse generation function is rendered inactive such wherein each buffer of said tree of buffers comprises a logic gate having a first input for receiving said clock signal, and a delay block for generating a delayed and inverted version of said clock signal, wherein a second input of said logic block is coupled to a reference voltage.

9. The clock tree of claim 8, wherein said logic gate is a NAND gate.

10. An integrated circuit comprising logic synchronized by a plurality of pulsed latches, and the clock tree of claim 8 arranged to supply a pulsed signal to each of said pulsed latches.

* * * * *